Nov. 23, 1943.  T. B. SALTER  2,334,844
ATTACHMENT FOR AIRCRAFT STRUCTURES
Filed Oct. 18, 1941

TOM B. SALTER
*INVENTOR.*

BY *James M. Clark.*
HIS PATENT ATTORNEY.

Patented Nov. 23, 1943

2,334,844

UNITED STATES PATENT OFFICE 2,334,844

ATTACHMENT FOR AIRCRAFT STRUCTURES

Tom B. Salter, Wichita, Kans., assignor to Cessna Aircraft Company, Wichita, Kans.

Application October 18, 1941, Serial No. 415,541

10 Claims. (Cl. 189—36)

The present invention relates to structural joints and connections, and more particularly to an improvement in attachments for joining thin wall sheets or skins in aircraft construction.

In the construction of hollow or monocoque bodies as currently used in fuselages, wings, tanks and other aircraft components, the arrangement of butt joints or connections in the outer skin or shell has presented many problems. In order to provide connections of moderate size and limited projection into the airstream, but at the same time of adequate structural rigidity and strength, prior joints have added considerable to the drag and weight of the aircraft body and have subjected the shell or skin to local stresses which tend to impair its structural efficiency. These problems have been particularly troublesome in connection with the design of plastic or laminated plywood aircraft and in structures in which both metal and plastic or composite constructions have been utilized.

It is accordingly a major object of the present invention to provide an improved joint or connection for thin walls or shells of hollow aircraft bodies, which provides relatively great structural strength and rigidity with a minimum of weight and projection beyond the plane of the shell or skin surface. It is a further object to provide such a connection which is adapted for joining like sections of the same skin material, that is, either metal, plastic, plywood or other materials, or for joining any two of these materials. A further object is the provision of a butt joint for such skin materials which increases the resistance of the material across the joint to both tensile and compressive forces over that to which the material per se is capable of resisting at its uninterrupted portions intermediate the joints.

A further and important object of the present invention resides in the provision of a butt joint, the mechanics of which is such that no bending stresses can be developed in the plane of the joint due to axial loads in the skins or shells. A further object resides in providing a joint for aircraft skin coverings in which no reinforcing ribs, bracing or supporting spars are necessary in its construction. A still further object is the provision of a substantially symmetrical butt joint, both in the plane of the joined surfaces and the transverse plane of the joint, which is accessible for assembly and disassembly entirely from the exterior of the hollow body or structure. Other objects and advantages of the present invention may occur to those skilled in the art after a reading of the present specification and the accompanying drawing forming a part hereof, in which;

Figure 1:
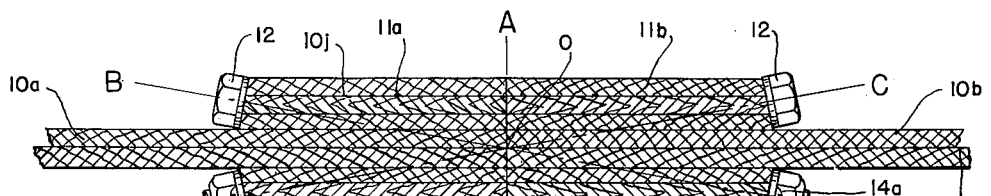
Fig. 1 shows a preferred form of my invention for joining two abutting laminated shells.

Referring now to Fig. 1, 10a and 10b represent two adjacent and abutting laminated sections which may form the skin portions of an aircraft fuselage, wing or any hollow body devoid of internal bracing or support such as a fairing, control surface, tank or other component. The herein described joints are applicable for connecting a wide variety of skin materials and are not limited to the specific materials which are referred to in this description purely for illustrative purposes. Accordingly, shells 10a and 10b may comprise a two-ply laminated plywood, the plys of which are suitably cemented at their joint 10j and impregnated by any of the known plastic compositions. The skin sections 10a and 10b are cut off at right angles such that they abut each other in a squared and flush relationship at the plane of the joint A—A. The skin sections 10a and 10b may be either flat or planar, or curved or one may be flat and the other curved.

To the free edges of the abutting sections 10a and 10b are suitably cemented plywood joint sections 11a and 11b of the said materials and construction as the skin sections but preferably with an additional ply similarly cemented at the joints 11j. The edges of the plywood joint sections 11a and 11b are similarly squared off such that they also abut the opposed or mating section in an aligned and flush relationship along the plane of the joint A—A. These joint blocks or sections 11a and 11b form in effect suitable flanges against which the joint halves might be bolted. The abutting halves of the joint are then temporarily held in a clamp or jig, whereupon they are bored or drilled diagonally along the axes B—B and C—C which are spaced transversely along the joint, but inclined such that they intersect the center line of the joint passing through the point O within the plane A—A. After the joint halves have been suitably bored anchor nuts 13 are fastened to the inner or lower sections of the joint halves in alignment with the bored holes. The anchor nuts 13 may be of any suitable type preferably having integral or attached flanges 14 through which they are mounted by the screws 14a to the corresponding joint sections, the nuts 13 preferably being of the elastic stop nut, or similar vibration-proof type. In fastening the joint halves after they have been brought into proper alignment, it is then only necessary to insert the through bolts 12 in their staggered and downwardly diagonal positions into the bored holes and tightening the same within the anchor nuts 13 which serve in this manner as blind fastenings.

Figure 2:
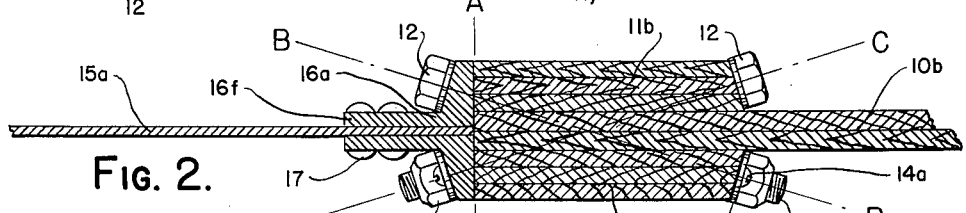
Fig. 2 shows a modified form of this joint for joining a metal skin to a laminated skin.

The modification shown in Fig. 2 is identical with that shown in Fig. 1 as regards the right or plastic composition half of the joint. The left half of the joint, however, is entirely of metal, preferably of the same materials as the metal skin section 15a. Two angle sections 16a which may be either rolled, extruded or otherwise formed, are disposed back-to-back against the upper and lower faces of the skin 15a with their outstanding legs flush with and square to the plane of the joint A—A. The flange angle members 16a are preferably formed with the back faces of their outwardly extending legs disposed at an angle such that the axes B—B and C—C passing normal thereto intersect the corresponding faces on the composition half of the joint 11b. The adjoining legs 16f of the angle members are suitably apertured for permanent fastening to the sheet 15a by means of the rivets 17; and the laminations of the opposite half of the joint are suitably cemented or joined at the joints 11j as previously described in connection with the construction shown in Fig. 1. After the joined halves have been suitably drilled and bored, the bolts 12 may be inserted and fastened to the anchor nuts 13 exclusively from the upper or outer face of the joint in the manner described for Fig. 1.

Figure 3:
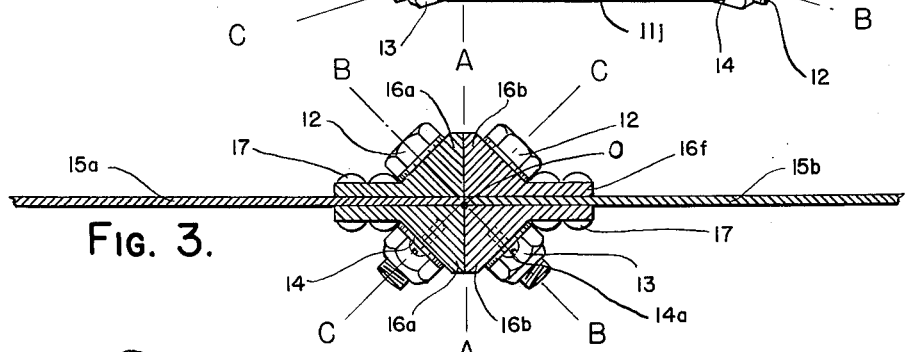
Fig. 3 shows a further modification of my improved joint for interconnecting two abutting metal skins or shells.
Figure 4:
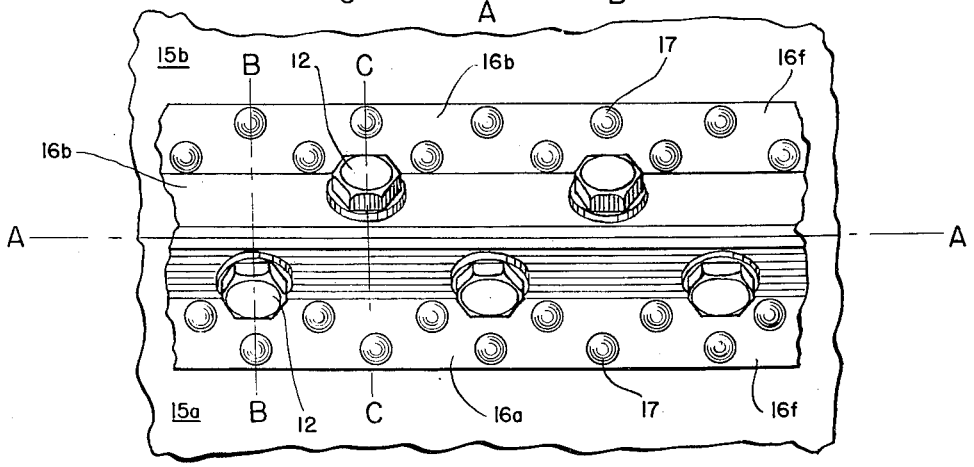
Fig. 4 shows a plan view of the joint shown in Fig. 3.

Figs. 3 and 4 disclose a joint of all-metal construction in which both halves may be identical with the left half portion of the previously described joint shown in Fig. 2. The only other essential difference between the joints of Figs. 2 and 3 being that the all-metal joint is symmetrical about both the plane of the joined skin sections 15a and 15b and the transverse plane of the joint A—A, passing through the center line O. The plan view of the joint as shown in Fig. 4 more clearly indicates the staggered relationship of the through bolts 12 and the rivets 17. The all-metal joint can similarly be made up or unfastened entirely from the outer face of the hollow body and the anchor nuts 13 are suitably fastened through their flanges 14 to the flange angles 16a and 16b. It will accordingly be noted that in the joints of Figs. 1 and 3 the center line passing through point O forms a center line of symmetry of the joint and that the mechanics of these joints are such that no bending stresses can be developed in the plane of the joint due to axial loads in the skins or shells.

Other forms and modifications which may occur to those skilled in the art both in respect to their general arrangement and detailed construction, are intended to come within the scope and spirit of my invention as more particularly defined in the appended claims.

I claim:

1. A joint for abutting skin construction, comprising reinforcing joint sections fastened to both faces of the abutting skins such that the edges of said sections and skins meet at a single transverse plane normal to said skin faces, and fastening means extending from each joint section to the diagonally opposite joint section.

2. A butt joint for aircraft construction, comprising a pair of abutting skin elements, flange elements fastened to the opposed edges of said skin elements, said skin and flange elements abutting in a transverse plane normal to said skin elements, and diagonally extending attachment means connecting each pair of diagonally opposite flange elements.

3. In a joint for aircraft skin construction having abutting flanged joint halves meeting in a perpendicular transverse plane, attachment means directly connecting a flange element on the outside of the skin surface on the first half of the joint with a flange element on the inside of the skin surface on the opposite half of the joint.

4. In a butt joint comprising two abutting skin elements, each having connection fittings secured to each element and abutting in a transverse plane normal to the plane of the skin elements, fastening means diagonally passing from one joint half to the other and from one face of the skin surface to the other, the axes of the fastening means passing diagonally through the transverse plane of the joint in the region of the plane of the skin surface.

5. In butt joint construction, a pair of shell elements abutting along a transverse plane, flange elements fastened to both sides of each said shell element forming joint halves which abut along said transverse plane such that the combined joint has a center line at the intersection of said transverse plane in the region of said shell elements about which the joint is symmetrical, and fastening means having their axes passing through said center line of symmetry and at an angle to said transverse plane.

6. In a butt joint for connecting a pair of thin wall sections, flange elements attached to the inner and outer faces of each said section, each said element having apertures having axes disposed at angles with respect to its attached section, anchor means attached to the said inner elements, and attachment means passing through said apertures for engagement with said anchor means such that the outer element of the first said section is directly attached to the inner element of the second said section, and the outer element of the second said section directly attached to the inner element of the first said section.

7. A joint for abutting skin construction, comprising reinforcing joint sections fastened to both faces of the abutting skins such that the edges meet at a single transverse plane normal to said skin faces, and fastening elements extending from each joint section to the diagonally opposite joint section such that the said joint is substantially symmetrical about both the plane of the skin and said transverse plane of abutment.

8. A butt joint for aircraft skin construction, comprising a pair of abutting skin elements, flange elements fastened to the opposed edges of said skin elements, and diagonally extending attachment elements connecting each pair of diagonally opposite flange elements such that the said butt joint is substantially symmetrical about both the plane of the said skin element and the transverse plane of abutment of the skin and flange elements.

9. In a joint for aircraft skin construction having abutting flanged joint halves meeting in a transverse plane, attachment elements directly connecting a flange element on the outside of the skin surface on the first half of the joint with a flange element on the inside of the skin surface on the opposite half of the joint such that the joint is symmetrical about both the transverse plane of abutment and the plane of the skin surface.

10. A joint for aircraft skin construction, comprising a pair of abutting skin elements, flange elements fastened to the edges of said skin elements having abutting surfaces lying in a transverse plane with respect to the said skin elements, and attachment means diagonally extending between diagonally opposite flange elements and passing through said transverse plane substantially at the line of intersection of said plane with the plane of the skin elements.

TOM B. SALTER.